C. A. FURTAW.
AIRSHIP.
APPLICATION FILED NOV. 9, 1910.

1,039,116.

Patented Sept. 24, 1912.
6 SHEETS—SHEET 3.

Witnesses
H. Strauss
R. N. Krenkel

Inventor
Charles A. Furtaw
By Joshua R. N. Potts
Attorney

UNITED STATES PATENT OFFICE.

CHARLES A. FURTAW, OF PHILADELPHIA, PENNSYLVANIA, ASSIGNOR TO FURTAW-McKAY MONOPLANE COMPANY, OF PHILADELPHIA, PENNSYLVANIA, A CORPORATION OF DELAWARE.

AIRSHIP.

1,039,116.     Specification of Letters Patent.     Patented Sept. 24, 1912.

Application filed November 9, 1910. Serial No. 591,422.

*To all whom it may concern:*

Be it known that I, CHARLES A. FURTAW, a citizen of the United States, residing at Philadelphia, in the county of Philadelphia and State of Pennsylvania, have invented certain new and useful Improvements in Airships, of which the following is a specification.

My invention relates to improvements in air ships, the object of the invention being to provide an air ship of the monoplane type having its plane of a particular shape, whereby the maximum of sustaining power is had.

A further object is to provide a monoplane having parallel vertical planes at the intermediate portion of the ship which absolutely prevents any possibility of sidewise shooting to earth.

A further object is to provide an improved construction of monoplane together with an improved construction of tail, which latter insures a self equilibrium of the machine, and which is utilized for steering in all directions.

A further object is to provide improved means for manipulating the improved tail, whereby the machine is steered vertically or horizontally.

A further object is to provide a machine of this character with an improved plane, which is constructed so as to cushion the shock of alighting, and do so automatically.

With these and other objects in view, the invention consists in certain novel features of construction and combinations and arrangements of parts, as will be more fully hereinafter described and pointed out in the claims.

In the accompanying drawings.

Figure 3:
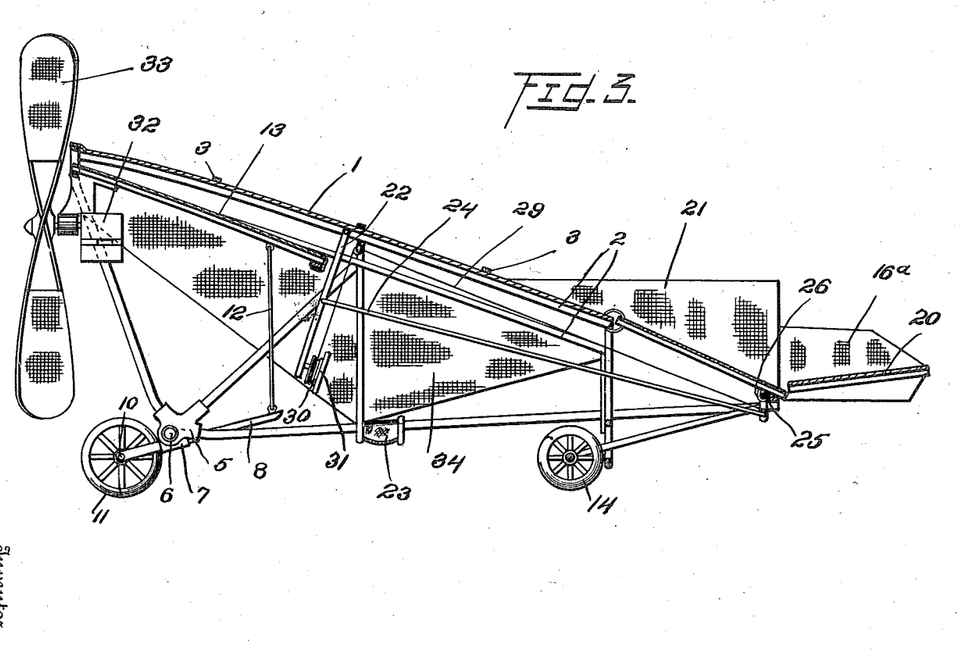
Fig. 3, is a view in longitudinal section through the center of the machine.
Figure 4:
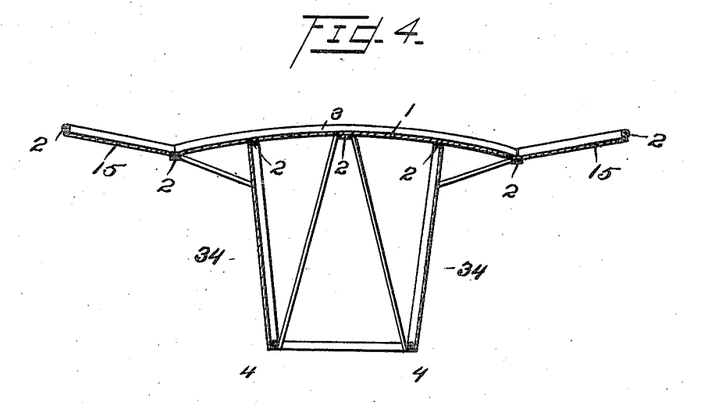
Fig. 4, is a view in transverse section on the line 4—4 of Fig. 2.
Figure 5:
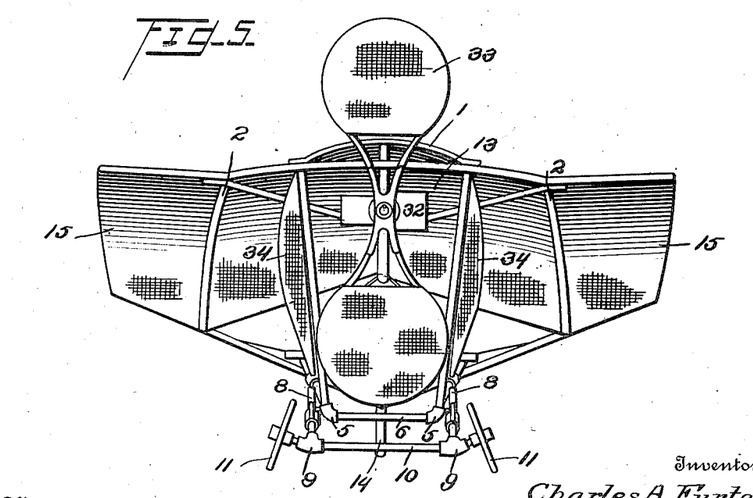
Fig. 5, is a view in front elevation.

1, represents the main plane of the machine, which is strengthened by longitudinal and transverse stays 2 and 3 respectively, and by a frame 4, the rods of which are connected to couplings 5 at the forward end of the machine, said couplings connected by transverse rods 6. The rod frame 4 together with the stays of the main plane 1 give a general triangular form to the framework as seen most clearly in Fig. 3. The transverse rod 6 acts as a journal in which brackets 7 are pivotally mounted. These brackets 7 support longitudinal bars 8, the forward ends of which are connected by couplings 9 with a transverse shaft 10 on the ends of which latter wheels 11 are mounted, the ends of said shaft 10 preferably bent as shown in Fig. 5, so as to position the wheels at an angle. The rear ends of the bars 8 are connected by ropes or other flexible connecting devices 12 with a plane 13, the latter pivotally lashed at its forward end to the forward end of the main plane 1 or framework supporting the latter. The rear end of this plane 13 is free to move up and down for a purpose which will hereinafter appear. A single wheel 14 is supported in the rear portion of the framework, and this wheel 14 together with the wheels 11, serve to support the machine as it moves over the ground.

Figure 1:
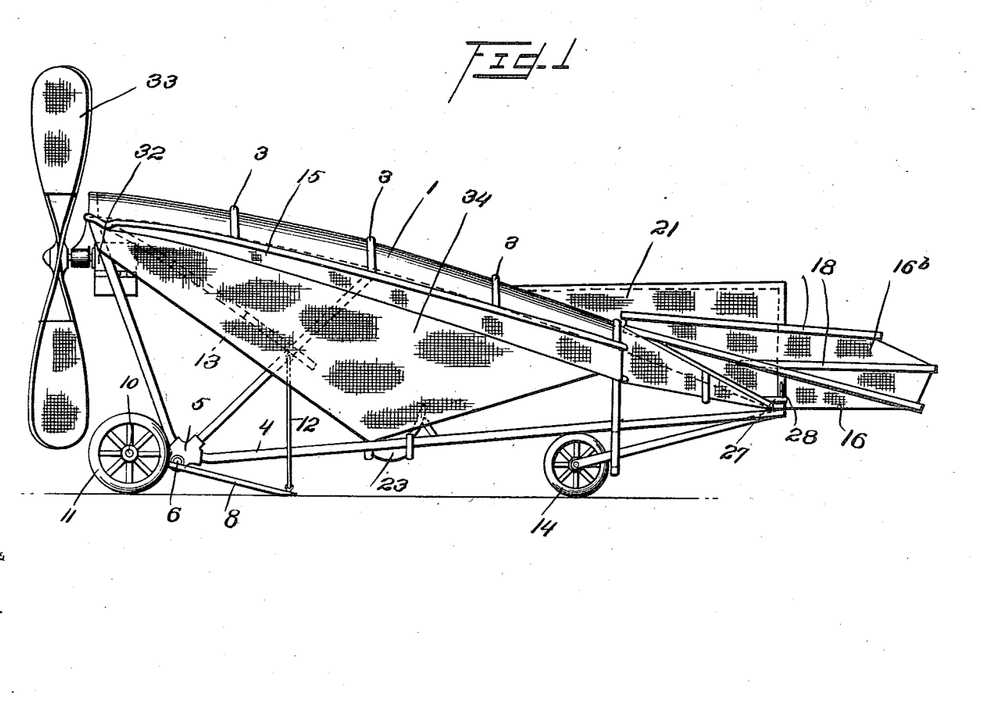
Figure 1, is a view in side elevation illustrating my improvements, in position on the ground.
Figure 2:
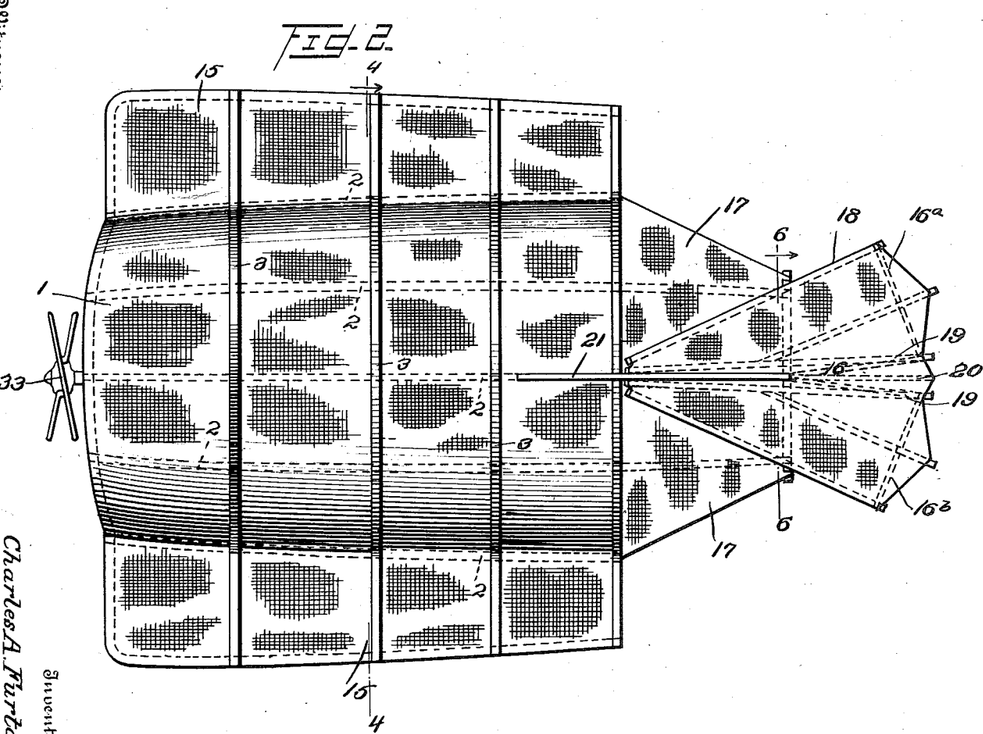
Fig. 2, is a top plan view.

One of the most important features of my invention is the shape of the main plane 1. This main plane 1 curves upwardly in the arc of a circle transversely at its central or intermediate portion, and inclines downwardly from front to rear in a general curved line as seen in Fig. 1. The side portions 15, 15, of this main plane 1 also curve downwardly from front to rear, but flare upwardly as they project outwardly, giving a wide bearing surface of the plane on the air. This shape of the main plane is maintained by means of suitable stays and braces not necessary to describe in detail, and the general appearance looking down upon the main plane is that of a bird in flight with wings extended, the rounded intermediate portion corresponding to the body of the bird, and the side portions 15 to the wings thereof. At the rear end of this main plane 1, my improved tail 16 is located which is of general triangular form in plan as illustrated in Fig. 2, and is positioned between two rearwardly projecting triangular extensions 17 on the main plane 1. This tail 16 is of a single stretch of canvas positioned on strengthening ribs 18. These ribs are disposed at an angle to each other, and the tail in plan is somewhat triangular but it folds on the lines 19 shown in Fig. 2, and has an intermediate raised portion 20. In other words this tail when manipulated may be tilted to right or left or may be pulled downward or upward or may be given any angle, its general function being flexibility, yet being under the entire control of the operator.

21, is a fin which extends from a point slightly in rear of the middle of the main plane and in line to a point about the center of the tail. This fin acts to steady the machine in its straight flight, and also assists in preventing any sidewise shooting to the earth.

For convenience I have applied several reference characters, namely, 16ª and 16ᵇ to the two side portions of the tail 16, as these side portions operate singly or in unison, and either manually or automatically as will hereinafter appear.

A lever 22 is pivotally connected at its upper end to the framework of the main plane 1, adjacent the center of the latter, and at its lower end terminates in convenient reach of the operator upon the seat 23. This lever 22 is connected by a rod 24 with a forked frame 25, the latter pivotally connected to the center stay of the tail 16 by suitable lashing 26. This frame 25 is of general T-shape with rearwardly projecting arms 27, the free ends of which are connected by links 28 with the members 16ª and 16ᵇ of the tail, hence when the frame 25 is swung longitudinally, both members 16ª and 16ᵇ will be moved vertically. When the frame 25 is moved transversely, one of the members 16ª and 16ᵇ as the case may be is pulled down, while the other is elevated, thus by moving this frame 25, the movement of the tail may be controlled manually and the tail also may move automatically in the event of a sudden shifting of the wind so as to automatically right itself.

To independently move the members 16ª and 16ᵇ which movement acts to steer the machine horizontally, I provide flexible connecting devices 29, which connect to the ends of the frame 25, and also to a drum 30 on the lower end of lever 22. The drum 30 is provided with a hand wheel 31, so that the operator may grasp this hand wheel, and by turning this hand wheel steer the machine horizontally, and by moving the lever 22 longitudinally of the machine steer the machine vertically.

Figure 6:
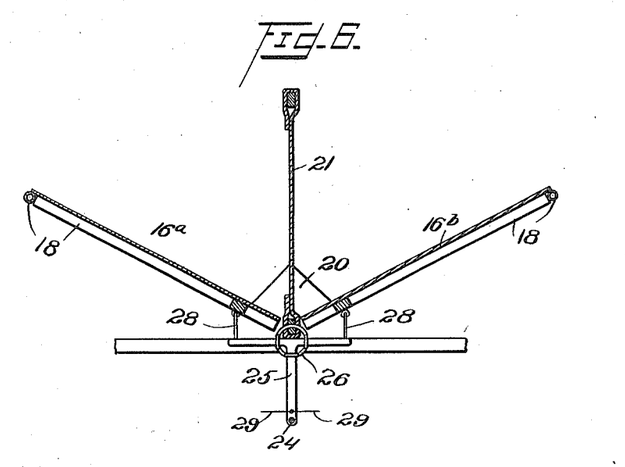
Fig. 6, is a view in transverse section on the line 6—6 of Fig. 2 on an increased scale.
Figure 7:
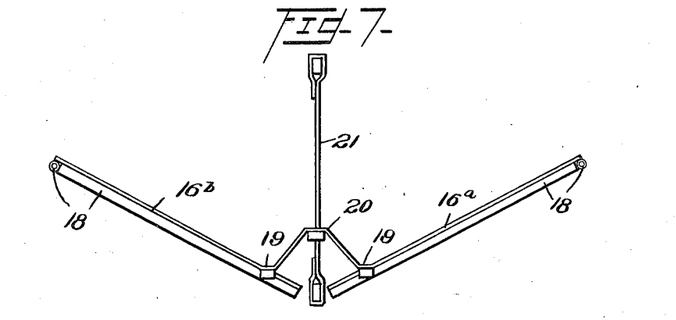
Fig. 7, is an end view of the tail of the device on an increased scale to that shown in Fig. 2.
Figure 8:
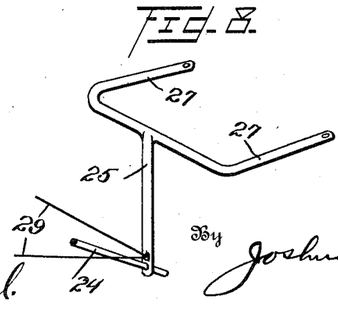
Fig. 8, is a detail perspective view illustrating a portion of the steering mechanism.

The tail which is formed as above explained, is mainly of canvas suitably stiffened and secured only to the fin 21. In other words, the canvas forming the tail has a longitudinal central opening to receive the fin, and is secured thereto. The other portions of the tail are free to move, and the longitudinal folds in the rear portion of the tail, which give it somewhat the appearance of a W in end elevation as seen in Figs. 6 and 7, allow the side portions of the tail to move with relation to the central portion.

The connection between the members 16ª and 16ᵇ of the tail, and the operating means, enables these members to be moved up and down together, or one up and the other down as above explained. These members, however, are automatic in their action, because they are sensitive to the varying air currents, or to any tendency of the machine to tilt. For example, if one member 16ª moves upwardly, the other member 16ᵇ will be drawn downwardly through the medium of the controlling mechanism. The operator, of course, must not resist this movement, but must allow the steering mechanism to move. Furthermore, such movement is immediately communicated to him, and the operator notes the tendency of the machine when it begins to tilt, and if the movement of the tail members is not sufficient, he can assist such movement to bring the machine to an equilibrium.

Figures 9, 10:
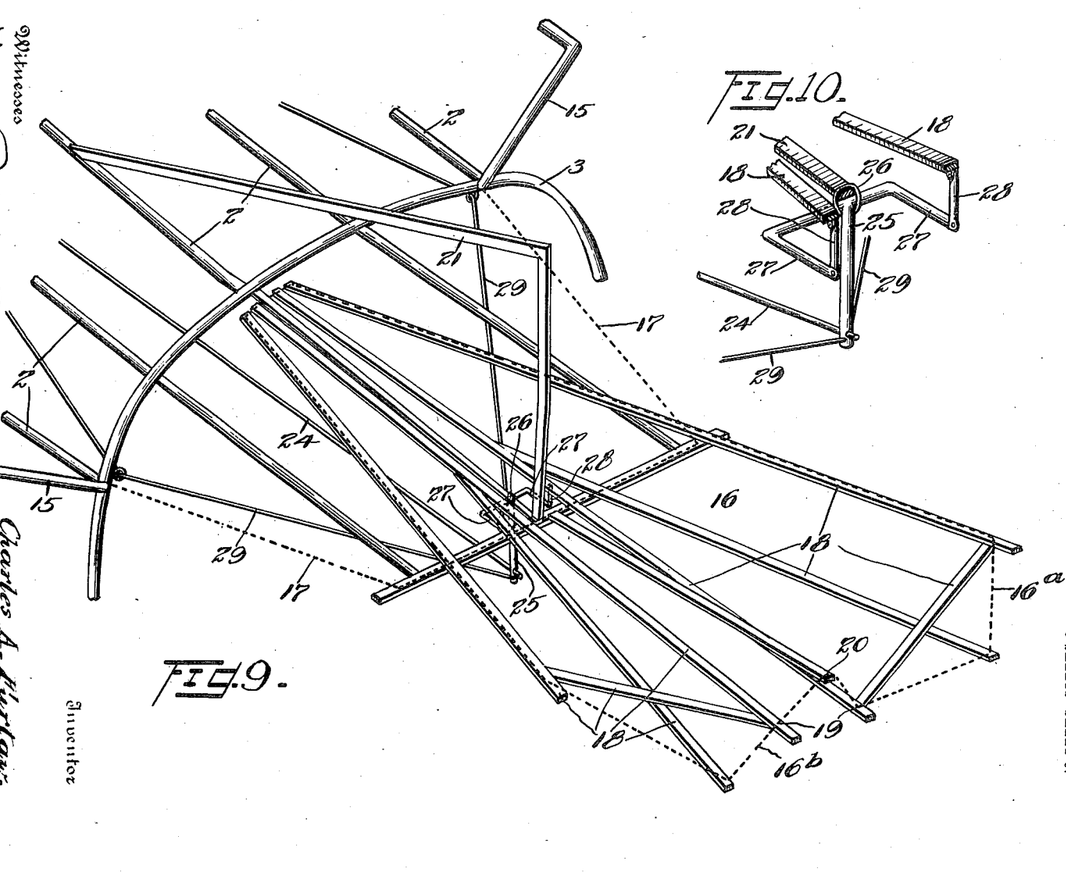
Fig. 9, is a perspective view on an enlarged scale showing in full lines the framework and controlling mechanism of the tail and tail support, and outlining in dotted lines the canvas covering on the tail.
Fig. 10, is a perspective view on an enlarged scale illustrating the forked frame 25 and the parts with which it is connected.

To more clearly illustrate the tail structure and its operating mechanism, attention is called particularly to Figs. 9 and 10. Fig. 9, shows in full lines the framework of the tail, the framework of the main portion of the machine at its rear end, and the means directly connected to the tail for manually operating the same. While in a full sized machine these several bars making up the framework of the tail will be as light as is possible consistent with the necessary strength the view shows such framework on an exaggerated scale. In dotted lines, the canvas is illustrated and this canvas serves to hold the framework in proper correlation, one part with the other. To form the approximate W shape at the rear end, certain of these bars must be bent, and the side frames of the tail with the canvas thereon are secured to the fin portion by the attachment of the canvas, preferably by sewing the canvas directly to the canvas of the fin.

The frame 15 which connects to the members of the tail compels the members of the tail to move together, one side moving upwardly as the other moves downwardly, and this is manually controlled by means of the steering mechanism above explained. As the machine moves through the air, sudden gusts of wind tilt one side of the tail, and while of course but slight movement would be permitted if the operator held the steering mechanism tightly, on the other hand, an experienced aviator will feel this tendency of the tail to move, and will allow it to move so as to automatically right itself. The automatic feature, therefore, of the tail is only such as is permitted by the aviator. Of course, the operation would be entirely automatic if the operator removed his hands from the steering wheel, but this is not desirable, because to do so would lose the manual control. The operator, therefore, simply allows his hands to move in accordance with the tendency of the hand wheel, as such movement is imparted by the movement of the tail, and when the term "automatic action or control" is used, it is intended to mean just such automatic equilibrium or control as is permitted by the operator. Therefore, while the operator could prevent any automatic control if he does not resist it, the tail will move in the air so as to maintain its equilibrium in ordinary gusts of wind.

In the upper portion of the framework at the forward end, the engine 32 is mounted and drives the propeller 33 to propel the machine through the air.

While the general shape of the main plane has a tendency to prevent sidewise shooting to earth, to absolutely prevent any possibility of such movement, longitudinally disposed vertical planes 34 extend from the intermediate portions of the main plane, are of general triangular form, and at their angles and lower end are secured to the framework 4. These planes 34 not only prevent sidewise tilting to earth, but also stabilize the machine, giving an extended supporting area to the ship when tilted, and compelling the ship to right itself even in treacherous wind.

The operation is as follows: Engine 32 is started, and the rapid turning of the propeller 33 will draw the machine over the ground, the latter running on the wheels 11 and 14. At the proper time, the operator pushes the lever 22 forwardly so as to depress both members 16ª and 16ᵇ of the tail, which will cause the main plane 1 to take the air and rise to the desired height, when the operator moves lever 22 rearwardly causing the tail levers to lift and by this means maintains the ship at the desired elevation. Should he desire to descend, he draws the lever 22 toward him elevating the levers 16ª and 16ᵇ, when the machine will gradually descend. To steer the machine to right or left, the aviator turns the hand wheel 31 and draws down one member 16ª or 16ᵇ, and elevates the other. If he wishes to go to the right, he depresses the right hand section 16ª, and elevates the left hand section 16ᵇ causing the machine to swing in the arc of a circle to the right. By the turning of the hand wheel in the opposite direction will cause the left hand section 16ᵇ to be depressed, and the right hand section 16ª to be elevated, causing the machine to swing in the arc of a circle to the left. The vertical planes 34 and the fin 21, together with the particular shape of the main plane 1, render the machine self stabilizing, in other words, a current of air in any direction will find its resistance against one or more of the planes above referred to, so that the machine always has a full bearing on the air, and always tends to right itself. The tail construction is such that a sudden blast of air may shift the position of the tail to compel the machine to maintain its horizontal or approximate horizontal without destroying its effectiveness from a manually operated stand point. When the machine alights, the contact of wheels 11 with the ground draws downwardly the rear ends of the bars 8, causing the plane 12 to be moved downwardly, cushioning the shock of contacting with the ground, and acting as a brake to bring the machine to a stop in a reasonable short distance. If desired, the aviator may press the rear ends of bars 8 against the ground to act as a brake, and bring the machine to a quick stop.

I would have it understood that the particular manner of forming the several planes, the arrangement of stays and braces, and other structural features for strength which economize weight are not material to the present invention, and the invention is therefore not limited thereto. Also various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An air ship comprising a main plane, a tail at the rear central portion of said main plane comprising two vertically movable side sections, and a longitudinally positioned vertical web between said side sections, substantially as described.

2. An air ship comprising a main plane, a tail at the rear central portion of said main plane comprising two vertically movable side sections, a longitudinally positioned vertical web between said side sections, and means for moving said wing sections in the same direction and in opposite directions, substantially as described.

3. An airship of the monoplane type comprising a main plane of greater length than breadth and when at rest on the ground inclining downwardly from front to rear, curved transversely in cross section at its intermediate portion, and at its sides flared outwardly and upwardly, a tail at the rear central portion of said plane, said tail folded longitudinally comprising two side sections capable of opposite vertical movement, substantially as described.

4. An airship, comprising a main plane of greater length than breadth and when at rest on the ground inclining downwardly from front to rear, curved transversely at its intermediate portion and flaring outwardly and upwardly at both sides of said curved portion, triangular extensions at the ends of said plane, and a triangular tail supported between said extensions, substantially as described.

5. An airship, comprising a main plane inclining downwardly from front to rear, curved transversely at its intermediate portion and flaring outwardly and upwardly at both sides of said curved portion, triangular extensions at the ends of said plane, and a triangular tail supported between said extensions, said tail folded at two points longitudinally, and both side members of said tail moved vertically, substantially as described.

6. An airship, comprising a main plane inclining downwardly from front to rear, curved transversely at its intermediate portion and flaring outwardly and upwardly at both sides of said curved portion, triangular extensions at the ends of said plane, and a triangular tail supported between said extensions, said tail folded at two points longitudinally, and both side members of said tail moved vertically, and means for moving said tail sections vertically, substantially as described.

7. An airship, comprising a main plane inclining downwardly from front to rear, curved transversely at its intermediate portion and flaring outwardly and upwardly at both sides of said curved portion, triangular extensions at the ends of said plane, and a triangular tail supported between said extensions, said tail folded at two points longitudinally, and both side members of said tail moved vertically, and means for moving vertically the tail sections independently and simultaneously, substantially as described.

8. In an air ship, the combination with a main plane inclining downwardly from front to rear, of a tail at the rear end of said plane folded at two points longitudinally, whereby the said sections are capable of independent movement, a pivoted lever, a pivoted frame connected with the tail sections, and a rod connecting said lever with said frame, whereby said tail sections are moved simultaneously in the same direction, substantially as described.

9. In an air ship, the combination with a main plane inclining downwardly from front to rear, of a tail at the rear end of said plane folded at two points longitudinally, whereby the said sections are capable of independent movement, a pivoted lever, a pivoted frame connected with the tail sections, a rod connecting said lever with said frame, whereby said tail sections are moved simultaneously in the same direction, a drum on said lever, and flexible connecting devices between said drum and said frame, whereby said tail sections may be moved in opposite directions, substantially as described.

10. An airship, comprising a main plane of greater length than breadth inclining downwardly from front to rear, curved transversely at its intermediate portion and flaring outwardly and upwardly at both sides of said curved portion, triangular extensions at the ends of said plane, a triangular tail supported between said extensions, and vertical longitudinal parallel planes extending downward from the main plane, substantially as described.

11. An airship, comprising a main plane of greater length than breadth inclining downwardly from front to rear, curved transversely at its intermediate portion and flaring outwardly and upwardly at both sides of said curved portion, triangular extensions at the ends of said plane, a triangular tail supported between said extensions, said tail folded at two points longitudinally, and both side members of said tail moved vertically, and vertical longitudinal parallel planes extending downward from the main plane, substantially as described.

12. An airship, comprising a main plane of greater length than breadth inclining downwardly from front to rear, curved transversely at its intermediate portion and flaring outwardly and upwardly at both sides of said curved portion, triangular extensions at the ends of said plane, a triangular tail supported between said extensions, said tail folded at two points longitudinally, and both side members of said tail moved vertically, means for moving said tail sections vertically, and vertical longitudinal parallel planes extending downward from the main plane, substantially as described.

13. An airship, comprising a main plane of greater length than breadth inclining downwardly from front to rear, curved transversely at its intermediate portion and flaring outwardly and upwardly at both sides of said curved portion, triangular extensions at the ends of said plane, a triangular tail supported between said extensions, said tail folded at two points longitudinally, and both side members of said tail moved vertically, means for moving vertically the tail sections independently and simultaneously, and vertical longitudinal parallel planes extending downward from the main plane, substantially as described.

14. In an air ship, the combination with a main plane of greater length than breadth inclining downwardly from front to rear, of a tail at the rear end of said plane folded at two points longitudinally, whereby the said sections are capable of independent movement, a pivoted lever, a pivoted frame connected with the tail sections, a rod connecting said lever with said frame, whereby said tail sections are moved simultaneously in the same direction, and vertical longitudinal parallel planes extending downward from the main plane, substantially as described.

15. In an air ship, the combination with a main plane of greater length than breadth inclining downwardly from front to rear, of a tail at the rear end of said plane folded at two points longitudinally, whereby the said sections are capable of independent movement, a pivoted lever, a pivoted frame connected with the tail sections, a rod connecting said lever with said frame, whereby said tail sections are moved simultaneously in the same direction, a drum on said lever, flexible connecting devices between said drum and said frame, whereby said tail sections may be moved in opposite directions, and vertical longitudinal parallel planes extending downward from the main plane, substantially as described.

16. An airship of the monoplane type comprising a main plane, inclining downwardly from front to rear, curved transversely in cross section at its intermediate portion and at its sides flared outwardly and upwardly, a pivoted frame, rollers on said pivoted frame, a plane connected at its forward end to the forward end of the main plane, and devices connecting said pivoted frame with said last-mentioned plane, whereby the pivotal movement of said frame causes a pivotal movement of said pivoted plane against the pressure of the latter on the air, substantially as described.

17. An airship of the monoplane type, comprising a main plane, inclining downwardly from front to rear, curved transversely in cross section at its intermediate portion, and at its sides flared outwardly and upwardly, a tail at the rear central portion of said plane, a pivoted frame, rollers on said pivoted frame, a plane connected at its forward end to the forward end of the main plane, and devices connecting said pivoted frame with said last-mentioned plane, whereby the pivotal movement of said frame causes a pivotal movement of said pivoted plane against the pressure of the latter on the air, substantially as described.

18. An airship of the monoplane type, comprising a main plane, inclining downwardly from front to rear, curved transversely in cross section at its intermediate portion, and at its sides flared outwardly and upwardly, a tail at the rear central portion of said plane, said tail folded longitudinally comprising two side sections capable of opposite vertical movement, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

19. An airship, comprising a main plane inclining downwardly from front to rear, curved transversely at its intermediate portion and flaring outwardly and upwardly at both sides of said curved portion, triangular extensions at the ends of said plane, a triangular tail supported between said extensions, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

20. An air ship, comprising a main plane inclining downwardly from front to rear, curved transversely at its intermediate portion and flaring outwardly and upwardly at both sides of said curved portion, triangular extensions at the ends of said plane, a triangular tail supported between said extensions, said tail folded at two points longitudinally, and both side members of said tail moved vertically, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

21. An airship, comprising a main plane inclining downwardly from front to rear, curved transversely at its intermediate portion and flaring outwardly and upwardly at both sides of said curved portion, triangular extensions at the ends of said plane, a triangular tail supported between said extensions, said tail folded at two points longitudinally, and both side members of said tail moved vertically, means for moving said tail sections vertically, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

22. An airship, comprising a main plane inclining downwardy from front to rear, curved transversely at its intermediate portion and flaring outwardly and upwardly at both sides of said curved portion, triangular extensions at the ends of said plane, a triangular tail supported between said extensions, said tail folded at two points longitudinally, and both side members of said tail moved vertically, means for moving vertically the tail sections independently and simultaneously, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

23. In an airship, the combination with a main plane inclining downwardly from front to rear, of a tail at the rear end of said plane folded at two points longitudinally, whereby the said sections are capable of independent movement, a pivoted lever, a pivoted frame connected with the tail sections, a rod connecting said lever with said frame, whereby said tail sections are moved simultaneously in the same direction, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

24. In an airship, the combination with a main plane inclining downwardly from front to rear, of a tail at the rear end of said plane folded at two points longitudinally, whereby the said sections are capable of independent movement, a pivoted lever, a pivoted frame connected with the tail sections, a rod connecting said lever with said frame, whereby said tail sections are moved simultaneously in the same direction, a drum on said lever, flexible connecting devices between said drum and said frame, whereby said tail sections may be moved in opposite directions, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

25. An airship, of the monoplane type, comprising a main plane, inclining downwardly from front to rear, curved transversely in cross section at its intermediate portion, and at its sides flared outwardly and upwardly, a tail at the rear central portion of said plane, vertical longitudinal parallel planes extending downward from the main plane, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normally horizontal line, substantially as described.

26. An airship of the monoplane type, comprising a main plane, inclining downwardly from front to rear, curved transversely in cross section at its intermediate portion, and at its sides flared outwardly and upwardly, a tail at the rear central portion of said plane, said tail folded longitudinally comprising two side sections capable of opposite vertical movement, vertical longitudinal parallel planes extending downward from the main plane, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

27. An airship, comprising a main plane inclining downwardly from front to rear, curved transversely at its intermediate portion and flaring outwardly and upwardly at both sides of said curved portion, triangular extensions at the ends of said plane, a triangular tail supported between said extensions, vertical longitudinal parallel planes extending downward from the main plane, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

28. An airship, comprising a main plane inclining downwardly from front to rear, curved transversely at its intermediate portion and flaring outwardly and upwardly at both sides of said curved portion, triangular extensions at the ends of said plane, a triangular tail supported between said extensions, said tail folded at two points longitudinally, and both side members of said tail moved vertically, vertical longitudinal parallel planes extending downward from the main plane, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

29. An airship, comprising a main plane inclining downwardly from front to rear, curved transversely at its intermediate portion and flaring outwardly and upwardly at both sides of said curved portion, triangular extensions at the ends of said plane, a triangular tail supported between said extensions, said tail folded at two points longitudinally, and both side members of said tail moved vertically, means for moving said tail sections vertically, vertical longitudinal parallel planes extending downward from the main plane, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

30. An airship, comprising a main plane inclining downwardly from front to rear, curved transversely at its intermediate portion and flaring outwardly and upwardly at both sides of said curved portion, triangular extensions at the ends of said plane, a triangular tail supported between said extensions, said tail folded at two points longitudinally, and both side members of said tail moved vertically, means for moving vertically the tail sections independently and simultaneously, vertical longitudinal parallel planes extending downward from the main plane, a pivoted frame, rollers, on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

31. In an airship, the combination with a main plane, inclining downwardly from front to rear, of a tail at the rear end of said plane folded at two points longitudinally, whereby the said sections are capable of independent movement, a pivoted lever, a pivoted frame connected with the tail sections, a rod connecting said lever with said frame, whereby said tail sections are moved simultaneously in the same direction, vertical longitudinal parallel planes extending downward from the main plane, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

32. In an airship, the combination with a main plane inclining downwardly from front to rear, of a tail at the rear end of said plane folded at two points longitudinally, whereby the said sections are capable of independent movement, a pivoted lever, a pivoted frame connected with the tail sections, a rod connecting said lever with said frame, whereby said tail sections are moved simultaneously in the same direction, a drum on said lever, flexible connecting devices between said drum and said frame, whereby said tail sections may be moved in opposite directions, vertical longitudinal parallel planes extending downward from the main planes, a pivoted frame, rollers on said pivoted frame, a plane connected at its forward end to the forward end of the main plane, devices connecting said pivoted frame with said last-mentioned plane, whereby the pivotal movement of said frame causes a pivotal movement of said pivoted plane against the pressure of the latter on the air, a longitudinally extending fin projecting from a point intermediate of the ends of the main plane to a point intermediate of the ends of the tail, and having its upper edge in a normal horizontal line, substantially as described.

In testimony whereof I have signed my name to this specification in the presence of two subscribing witnesses.

CHARLES A. FURTAW.

Witnesses:
P. H. KRENKEL,
CHAS. E. POTTS.